(12) United States Patent
Pyle et al.

(10) Patent No.: US 6,939,920 B2
(45) Date of Patent: Sep. 6, 2005

(54) TIRE SIDEWALL COMPOUNDS HAVING IMPROVED FLEX FATIGUE AND TREAD COMPOUND HAVING IMPROVED TEAR STRENGTH

(75) Inventors: Kevin James Pyle, Uniontown, OH (US); Richard Robinson Smith, Cuyohoga Falls, OH (US); Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 62 days.

(21) Appl. No.: 09/756,334

(22) Filed: Jan. 8, 2001

(65) Prior Publication Data

US 2002/0139461 A1 Oct. 3, 2002

(51) Int. Cl.⁷ .......................... B60C 1/00; B60C 11/00; B60C 13/00; C08F 136/06; C08L 7/00
(52) U.S. Cl. ................. 525/236; 152/209.1; 152/209.5; 152/525; 152/905
(58) Field of Search .......................... 152/209.1, 209.5, 152/905, 525; 525/236, 237, 269, 274

(56) References Cited

U.S. PATENT DOCUMENTS

| | | | |
|---|---|---|---|
| 3,668,162 A | * | 6/1972 | Wilt |
| 4,983,695 A | | 1/1991 | Kuzma et al. ............... 526/142 |
| 5,100,982 A | * | 3/1992 | Castner |
| 5,244,028 A | | 9/1993 | Segatta et al. ............... 152/525 |
| 5,451,646 A | | 9/1995 | Castner ....................... 526/137 |
| 5,698,643 A | * | 12/1997 | Donbar et al. |
| 5,885,389 A | * | 3/1999 | Sandstrom et al. |
| 5,975,173 A | * | 11/1999 | Izumoto et al. |
| 6,046,266 A | | 4/2000 | Sandstrom et al. ......... 524/492 |
| H2036 H | * | 7/2002 | Bush |
| 6,422,953 B1 | * | 7/2002 | Nesbitt et al. |
| 6,437,205 B1 | * | 8/2002 | Miller et al. |
| 2002/0011293 A1 | * | 1/2002 | Zanzig et al. .......... 152/209.16 |

FOREIGN PATENT DOCUMENTS

| | | | |
|---|---|---|---|
| EP | 1033265 | 9/2000 | ............ B60C/1/00 |
| GB | 2350615 | * 12/2000 | |
| JP | 54-132907 | * 10/1979 | |
| JP | 64-66248 | * 3/1989 | |
| WO | WO 99/52720 | * 10/1999 | |

OTHER PUBLICATIONS

Abstract for Canada 1236648.*
European Search Report.

* cited by examiner

Primary Examiner—Steven D. Maki
(74) Attorney, Agent, or Firm—Alfred D. Lobo; Henry C. Young, Jr.

(57) ABSTRACT

Sidewalls of a pneumatic tire have greater resistance to failure due to dynamic flexing and abrasion, and the tire's tread has better resistance to tearing than with conventionally used rubber compositions, when sidewalls and tread are formed from a compound having a major proportion by weight of synthetic rubber (SR) and a minor proportion by weight of natural rubber (NR), and a major proportion by weight of the SR itself consists essentially of a high cis-1, 4-polybutadiene having defined molecular architecture. The high cis-1,4-PBD has more than 90 percent cis-structure, a poly-dispersity in the range from about 3 to 5, a number average molecular weight Mn in the range from 100,000 to 150,000 and a degree of branching in the range from 2 to 3.5. The sidewall compound has characteristics quite different from one made with a typical commercially available high cis-1,4-PBD; and the tread has excellent tear strength. The dendritic structure of the high HI cis-1,4-PBD molecules has an unexpectedly beneficial effect on the performance characteristics of the sidewall and tread, particularly important in a high-performance automobile tire.

4 Claims, No Drawings

TIRE SIDEWALL COMPOUNDS HAVING IMPROVED FLEX FATIGUE AND TREAD COMPOUND HAVING IMPROVED TEAR STRENGTH

FIELD OF THE INVENTION

This invention relates to a pneumatic rubber tire having a sidewall and/or tread made predominantly of synthetic rubber ("SR") a major proportion by weight of which is a relatively low molecular weight high cis-1,4-polybutadiene ("cis-1,4-PBD") rubber, so termed because its "cis" content is at least 90 percent, with a relatively broad molecular weight distribution "Mw/Mn" or "polydispersity". The remaining rubber is natural rubber ("NR") used in minor proportion relative to the SR. Such a sidewall shows improved fatigue performance; moreover, the sidewall compound has better processing characteristics relative to others compounded with a high cis-1,4-PBD polymer but having lower polydispersity and higher number average molecular weight Mn, with polymer chains which are less branched. A sidewall made with the composition (sidewall compound) of the invention also shows improved resistance to propagation of a cut ("cut growth"), and better tear resistance (tear strength) which is also exhibited in a tread; the novel tread compound exhibits better tear resistance than that exhibited by a tread made with any other cis-1,4-PBD having essentially the same Mooney viscosity, all other ingredients being the same.

BACKGROUND OF THE INVENTION

State of the art pneumatic rubber tires are typically prepared with a rubber tread on a toroidal carcass having a sidewall which extends between and connects opposite sides of the tread to opposed spaced apart wire beads. As a tire is driven over pavement it is flexed continuously, the higher the load carried by the tire and the higher its speed, the greater the strain imposed which causes higher stress during dynamic flexing. A cut in the sidewall tends to grow faster as the strain and resultant stress levels increase. In addition, a sidewall of a tire used on a typical automobile is subjected to weathering, and scuffing against curbs when the car is being parked. The combination of high strain and resultant high stress accelerates damage caused by heat buildup and ozone degradation.

Though such degradation also takes its toll on the tread, tear resistance of a tire's tread is of greater importance and even a small improvement thereof is deemed a substantial contribution to the tread's performance. In U.S. Pat. No. 6,046,266 Sandstrom et al teach an improved tread composition containing precipitated silica and a combination of trans-1,4-and cis-1,4-PBD but did not suggest that the substitution of any particular cis-1,4-PBD might contribute any particularly desirable property.

To obtain a desirable balance of properties the art has modified both the NR and SR components in a blend, as well as the relative amounts used of each, and the blend contains various antiozonants/antioxidants (hereinafter, together, "antidegradants"), fillers and curing agents. Choosing the best components for a sidewall recipe is complicated by the requirement that not only they be co-curable in a particular range of temperature, but also that they be compatible when cured. Over the years, improvements have made the modern high speed passenger tire reliable, rugged and affordable. Because fatigue performance of current sidewall compounds is already highly satisfactory, the ability to improve sidewall performance further is not easily achieved.

U.S. Pat. No. 5,451,646 to Castner disclosed that the use of p-styrenated diphenylamine or hexadiene effectively reduced the molecular weight of the cis-1,4-polybutadiene ("cis-1,4-PBD") produced with a conventional organonickel-based "catalyst package". Unlike with cis-1,4-PBD produced by conventional organometal catalysts, a cis-1,4-PBD produced with p-styrenated diphenylamine as the molecular weight reducer in the catalyst package has produced unexpectedly good performance characteristics in a sidewall. It is believed that an arylamine affects the structural activity of organonickel-based catalyst packages which are a combination of an organonickel compound, an organoaluminum compound and a fluorine-containing compound, as disclosed in U.S. Pat. No. 4,983,695 to Kuzma et al. Other organometal-based catalyst packages may be modified to produce polymer chains of cis-1,4-PBD having a more dendritic (branched) structure than those produced with hexadiene.

Though the high cis-1,4-PBD produced with the amine or hexadiene modifiers had a cis-content in excess of 95 percent, there is no suggestion that the molecular architecture of the PBDs was either similar or different. Castner disclosed he found it unnecessary to oil-extend the '646 cis-1,4-PBD to improve its processability, indicating it processed as if it had a lower molecular weight than other high cis-1,4-PBDs. One skilled in the art would know that a lower molecular weight polymer will process more easily than the same polymer having a higher molecular weight. Castner did not suggest that either the polydispersity or the branched chain structure of the mass of one high cis-1,4-PBD was different from that of another; or that the properties of a compounded rubber would depend upon the molecular architecture of the cis-PBD produced; or that the molecular architecture had a critical influence in the compound; or that the molecular architecture was controlled by the organometal-based catalyst package with which the cis-PBD was produced.

Therefore one would not expect that a particular high cis-1,4-PBD would have a substantially different compounding effect compared with that of any other high cis-1,4-PBD of essentially the same molecular weight but different molecular architecture, in particular, its dendritic structure, its hydrodynamic volume and its polydispersity. In particular, it was unexpected that a first high cis-1,4-PBD having essentially the same Mooney viscosity as a second high cis-1,4-PBD would provide worse performance characteristics than the second, mainly because the second had a lower Mn, a higher polydispersity and a greater degree of branching.

U.S. Pat. No. 5,244,028 to Segatta et al. teaches that a precipitated silica filler having a BET surface area of between 100 and 250 square meters per gram and a pH in the range 4.0 to 6.5 improves the properties of conventional antidegradants in a sidewall composition, regardless of which synthetic rubbers are used in the composition. Segatta et al. disclose that mixtures of NR and PBD may be used, as well as mixtures of the various types of PBD including a high cis-1,4-PBD wherein at least 90 percent of its butadiene repeat units are a cis-1,4-isomeric structure, and other synthetic rubbers such as medium vinyl PBD having from 40 to about 60 percent 1,2-vinyl repeat units, and trans-1,4-PBD having at least 65 percent trans-1,4 repeat units. It focussed the effect of a particular filler but failed to suggest that any particular high cis-1,4-PBD might inculcate better performance characteristics than another. They could not have known that a nickel-based catalyst package in which an arylamine was used as a molecular weight reducer, produced a relatively low molecular weight high cis-1,4-PBD which had a higher polydispersity and higher degree of branching than others of comparable viscosity. The degree of branching is measured in a 0.1 percent concentration of polymer in a solution of tetrahydrofuran (THF), as a ratio of light scattering to refractive index. The light scattering and refractive index measurements are made at the outlet of a GPC column. The results are corroborated by measurements of solution viscosity in a solvent such as THF or toluene, such solvent molecules having a higher affinity for high cis-1,4-PBD molecules than a θ (theta) solvent.

Since the branched chain structure of high cis-1,4-PBD molecules of approximately the same Mooney viscosity would be expected to have substantially the same molecular weight, irrespective of the process by which each was prepared, there was no reason in the prior art to expect that a particular high cis-1,4-PBD might have a structure which was so different as to change both, the properties and the processing characteristics of the sidewall compound, both substantially; the art failed to recognize that the fatigue performance characteristics of a sidewall compound could be affected by tailoring the molecular architecture of the synthetic rubber component.

SUMMARY OF THE INVENTION

It has been discovered that a mass of high cis-1,4-PBD which has a higher degree of branching and a higher heterogeneity index ("HI", also referred to as molecular weight dispersity or polydispersity) than those of other high cis-1,4-PBDs, results in compounding properties found highly desirable in a rubber component of a sidewall or a tread.

It is therefore a general object of this invention to provide a sidewall or tread compound made with from 55 to 70 phr (parts per hundred parts of all rubber present) of high HI, high cis-1,4-PBD (referred to as a "high HI cis-1,4-PBD") having a unique branched chain molecular structure, the remaining rubber being NR; the virgin "high HI cis-1,4-PBD" (not extended or diluted to lower its viscosity) has a Mooney in the range from about 40 to 55, a number average molecular weight Mn in the range from about 100 to 150, a polydispersity or HI in the range of from about 3 to 5, and a degree of branching (ratio of light scattering response to refractive index in THF) in the range from about 2 to 3.5.

It is also a general object of this invention to tailor the SR content of a sidewall or tread compound with a PBD having a polydispersity in the range from about 3 to 5; to improve both "tensile strength (or break strength)" and "elongation percent at break" of the sidewall compound, each in the range from about 7 percent to 17 percent, compared to those of a sidewall compound made with a high-cis-1,4-PBD having essentially the same Mooney viscosity; and to improve the tear resistance of the tread compound in the range from about 10 percent to 15 percent compared to that of a tread compound made with a high-cis-1,4-PBD having essentially the same Mooney viscosity.

In a specific example, the "high HI cis-1,4-PBD" has at least a 90 percent cis-content, preferably greater than 95 percent, and most preferably an essentially "all cis-" structure; an essentially "all cis-" structure refers to one in which less than 3 percent of all the molecules have a structure which is not cis-1,4-; most preferred is a PBD having about 98 percent cis-content, the remaining being trans-and/or vinyl PBD.

It is another specific object of the invention to provide a rubber tire with a sidewall or tread having NR in a minor proportion by weight relative to the synthetic rubber ("SR") in it; the SR contains a major proportion of "high HI cis-PBD" having the properties given above. The sidewall exhibits unexpectedly superior resistance to flexural fatigue and cut growth compared to a sidewall containing another high cis-PBD with comparable Mooney but lower polydispersity and a lower degree of branching; the tread exhibits unexpectedly superior tear resistance while maintaining substantially the same other properties of a state-of-the-art tread made with another cis-1,4-PBD. The less the relative amount of the high HI cis-1,4-PBD with respect to any other SR present, the less the perceived benefit of the '646 high cis-1,4-PBD.

It is a more specific object of this invention to provide a pneumatic tire having a sidewall or tread made with a compound consisting essentially of more than 50 phr of synthetic rubber and less than 50 phr of NR; further, the synthetic rubber consists essentially of a major amount of high HI cis-1,4-PBD, the remaining synthetic rubber being selected from the group selected from commercially available high cis-1,4-PBD not a high HI cis-1,4-PBD; other conventionally used ingredients being used in amounts generally used.

It is another general object of this invention to provide a pneumatic tire having a sidewall or tread made from a compound having both improved "tensile strength (or break strength)" and "elongation percent at break", using a high HI cis-1,4-PBD to provide a greater improvement in the amount of energy under a curve plotting tensile strength against percent elongation at break than that which is provided by a sidewall compound having a lower HI and a lower degree of branching than other high cis-1,4-PBDs having the same Mooney viscosity.

DETAILED DESCRIPTION OF PREFERRED EMBODIMENTS

This invention produces a pneumatic tire comprising a generally toroidal carcass with a circumferential tread, shaped beads and a sidewall extending between the tread and beads. The compound from which the tire's sidewall is made preferably comprises less than 50 phr NR and more than 50 phr of synthetic rubber, the latter containing a major proportion by weight of high HI cis-1,4-PBD and a minor proportion by weight of another synthetic PBD; less than 10 phr of an antidegradant; from about 35 to 65 phr of carbon black; less than 5 phr of a tackifier resin and/or a peptizer; less than 15 phr total, of each of a processing aid, typically an aromatic, naphthenic, and/or paraffinic processing oil, zinc oxide, wax, preferably a mixture of microcrystalline waxes; a fatty acid, typically stearic acid.

The compound from which the tire's tread is made preferably comprises less than 50 phr NR and more than 50 phr of synthetic rubber, the latter containing a major proportion by weight of high HI cis-1,4-PBD and a minor proportion by weight of another synthetic PBD; about 40 to about 80 phr of an inert reinforcing filler, preferably a combination of carbon black and precipitated silica, carbon black being present in a major proportion by weight of the filler; a suitable coupling agent; a rubber processing oil; and other conventionally used ingredients including antidegradants, accelerators, etc. in amounts typically used. The novel tread compound is most preferably prepared in three stages; and it is cooled to ambient (room) temperature after each stage. The high HI cis-1,4-PBD may also be used in compounds for the production of tread base, wire coat, ply coat, chafer, wedge and apex components of a tire.

The high HI cis-1,4-PBD most preferred is made by polymerizing 1,3-butadiene in the presence of an organonickel or organocobalt ("organo-Ni/Co") compound, an organoaluminum compound, a fluorine containing compound, and para-styrenated diphenylamine; wherein the organoaluminum compound and the fluorine containing compound are brought together at a temperature in the range from about −10° C. to about 120° C. in the presence of the para-styrenated diphenylamine. Typically a trialkylaluminum compound, and hydrogen fluoride (HF) or a HF complex are used with an organo-Ni/Co compound, most preferably a nickel salt of a carboxylic acid and from 0.25 phm (parts by weight per hundred parts of monomer) to about 1.5 phm of the para-styrenated diphenylamine. Further details are provided in the '646 patent the disclosure of which is incorporated by reference thereto as if fully set forth herein.

The antidegradant is selected from the group consisting of amines, phenolics, quinolines and mixtures thereof, microcrystalline and paraffinic waxes having melting points in the range from about 30° C. to about 100° C. such as are disclosed in *The Vanderbilt Rubber Handbook* (1990), Pages 366 and 367. Typical antioxidants include diphenyl-p-phenylenediamine and others, such as, for example, those disclosed in *The Vanderbilt Rubber Handbook* (1990), Pages 343 through 362. Typical antiozonants include N-(1,3-dimethylbutyl)-N'-phenyl-p-phenylenediamine available as Santoflex 6PPD from The Flexys Company, and others disclosed in *The Vanderbilt Rubber Handbook* (1990), Pages 363 through 365. Typical peptizers include pentachlorothiophenol and dibenzamidodiphenyl disulfide. Choice of the appropriate additives and their relative amounts is well within the skill of a rubber compounder and only incidental to the invention which is primarily directed to the utilization of a high HI cis-1,4-PBD as a major constituent of the synthetic rubber portion of a sidewall or tread.

Vulcanization is effected by a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators which is generally used of which the primary accelerator is usually used in the larger amount (0.5 to 1.0 phr), and a secondary accelerator which is generally used in smaller amounts (0.05 to 0.50 phr) in order to activate and to improve the properties of the vulcanizate. Combinations of these accelerators have been known to produce a synergistic effect of the final properties and are generally preferred over the use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. As with other conventional ingredients the use of a sulfur vulcanizing agent and accelerator(s) is only incidental to the tire constructed with the specified NR and SR components.

The process conditions and equipment for producing the sidewall compound are conventional; a first essentially homogeneous blend is preferably produced in a first non-productive stage by mixing at a temperature in the range from about 130° C. to 170° C. for from about 1 to 10 min, allowed to cool to ambient temperature, then, in a second productive stage, blended at a temperature in the range from about 80° C. to 120° C. for from about 1 to 4 min, until essentially homogeneous with an antidegradant(s), sulfur and accelerator(s).

In the following Table A is listed side-by-side, the properties of three virgin high cis-1,4-PBDs obtained from The Goodyear Tire & Rubber Company, and each of which was used in identical amounts in a recipe for a sidewall compound.

TABLE A

|  | Budene ®1207 | Budene ®1208 | Budene ®1280 |
|---|---|---|---|
| cis- content, percent | 98 | 98 | 98 |
| trans- content, percent | 1 | 1 | 1 |
| vinyl content, percent | 1 | 1 | 1 |
| Tg, ° C. | −105 | −104 | −104 |
| Mooney | 54 | 45 | 45 |
| Mn × $10^{-3}$ | 251 | 209 | 127 |
| Mw × $10^{-3}$ | 532 | 481 | 445 |
| HI[1] | 2.1 | 2.3 | 3.5 |
| DB[2] | 1.6 | 1.6 | 2.88 |

[1]HI = heterogeneity index or polydispersity
[2]DB ratio = degree of branching

The DB ratio is determined by dissolving the PBD in THF to yield a 0.1 percent concentration solution, and measuring the ratio of its light scattering response in a GPC column to its refractive index.

The tire of this invention can be built, shaped, molded and cured by any desirable conventional method used by one skilled in the art. The invention may be better understood by reference to the following example in which the parts and percentages are by weight unless otherwise indicated.

In the following examples "phr" refers to parts per 100 parts of rubber, the rubber not including any other compounding ingredients, and each PBD has a cis-1,4-content greater than 95 percent; "high" HI refers to an HI in the range from 3 to 5; high degree of branching refers to a ratio in the range from 2 to 3.5.

EXAMPLES

Three sidewall compositions are prepared containing 60 phr of high-cis-1,4-PBD and 40 phr NR by being mixed with carbon black and conventional processing aids in two stages, a non-productive (first) stage and a productive (second) stage, under conditions set forth in Table 1 below. Each high cis-1,4-PBD is made with a nickel-based catalyst package to yield an essentially all-cis-content. The compounds are identified as follows:

Compound A: made with essentially all-cis-1,4-PBD having a relatively higher molecular weight than the other two all-cis-PBDs as evidenced by a Mooney viscosity of 55; it is well known that the weight average molecular weight Mw of PBD is directly proportional to its Mooney viscosity.

Compound B: made with an essentially all-cis-1,4-PBD having a relatively lower molecular weight (Mooney viscosity of 45) than the all-cis-1,4-PBD used in Compound A.

Compound C: the compound of this invention, is made with an essentially all-cis-1,4-PBD high HI cis-1,4-PBD having a molecular weight (Mooney viscosity of 45) essentially the same as that of the all-cis-1,4-PBD used in Compound B, but having higher polydispersity and a higher degree of branching than either of the all cis-1,4-PBDs used in compounds A or B.

TABLE 1

| Compound No. | A | B | C |
|---|---|---|---|
| Non-Productive Stage | | | |
| Natural rubber | 40 | 40 | 40 |
| High cis 1,4-PBD[1] (55 Mooney) | 60 | 0 | 0 |
| High cis-1,4-PBD[2] (45 Mooney) | 0 | 60 | 0 |
| High HI cis-1,4-PBD[3] (45 Mooney) | 0 | 0 | 60 |
| Carbon black (ASTM N550) | 50 | 50 | 50 |
| Processing Oil[4] | 10 | 10 | 10 |
| Wax | 1.5 | 1.5 | 1.5 |
| Zinc oxide | 3 | 3 | 3 |
| Fatty Acid | 1.5 | 1.5 | 1.5 |
| Antiozonant + Antioxidant[5] | 5.5 | 5.5 | 5.5 |
| Productive Stage | | | |
| Accelerator (sulfenamide type) | 0.5 | 0.5 | 0.5 |
| Sulfur | 2 | 2 | 2 |

[1]Budene ® 1207 high cis 1,4-PBD from the Goodyear Tire & Rubber Co.
[2]Budene ® 1208 high cis 1,4-PBD from the Goodyear Tire & Rubber Co.
[3]Budene ® 1280 high cis 1,4-PBD from the Goodyear Tire & Rubber Co.
[4]Flexon 641 from Exxon Mobil
[5]p-phenylenediamine and quinoline types First stage processing of each of the foregoing compounds was as follows:

| Compound No. | A | B | C |
|---|---|---|---|
| Work, MJ/m | 624 | 615 | 575 |
| Torque, Kg | 4.1 | 4.0 | 3.6 |
| Power, KW | 1.8 | 2.0 | 1.6 |
| Dump Temp., ° C. | 130–170 | 130–170 | 130–170 |

Second (Productive) Stage processing conditions were as follows:

| Compound No. | A | B | C |
|---|---|---|---|
| Work, MJ/m | 359 | 372 | 343 |
| Torque, Kg | 3.7 | 3.7 | 3.5 |
| Power, KW | 1.1 | 1.2 | 1.0 |
| Dump Temp., ° C. | 80–120 | 80–120 | 80–120 |

TABLE 2

Properties of the Sidewall Compounds

| Compound No. | A | B | C |
|---|---|---|---|
| Modulus, 100% | 1.53 | 1.48 | 1.38 |
| Modulus, 150% | 2.32 | 2.23 | 2.08 |
| Modulus, 200% | 3.51 | 3.37 | 3.17 |
| Modulus, 300% | 6.86 | 6.68 | 6.33 |
| Break Strength, MPa | 12.94 | 13.77 | 14.76 |
| Elongation at Break (%) | 502 | 536 | 586 |
| Energy, J | 99.0 | 109.4 | 129.66 |

The above data indicate the break strength of C is 7 percent and 14 percent better than those for B and A respectively; and the percent elongation at break of C is 9 percent and 17 percent better than those for B and A respectively.

The value of Energy, J is calculated as the area under the curve of a plot of "break strength (or tensile strength)" against "percent Elongation at Break".

It is evident that the Energy value (129.66 J) for Compound C is about 19 percent greater than the Energy value (109.4 J) for Compound B, each compound being made with the identical components to have the same Mooney, except that Compound C was made with high HI cis-1,4-PBD. Note that the break strength and percent elongation at break were only about 10 percent higher for Compound C than the values for Compound B.

TABLE 3

Properties of Compared Sidewall Compounds

| Compound No. | A | B | C |
|---|---|---|---|
| Hardness at 23° C., Shore A | 53 | 53 | 50 |
| Hardness at 100° C., Shore A | 48 | 48 | 46 |
| Rebound at 23° C., ASTM D-1024 | 63 | 62 | 60 |
| Rebound at 100° C., ASTM D-1024 | 69 | 68 | 67 |
| Specific gravity | 1.094 | 1.093 | 1.095 |

As one would expect, the specific gravity and Rebound of each Compound A, B and C is essentially the same as the only variable is the unique polymer structure generated by the organonickel catalyst package.

Crack growth resistance is measured by a Pierced Groove Flex test conducted at 93° C. at 360 cycles/min using a conical piercing needle 1/32" in diameter using a 6"×1.5"× 0.25" sample using 180° flex wherein the flex region is a 1/4" diameter molded groove against the grain of the sample. The results after defined intervals of 15 min and multiples thereof are set forth in Table 4 below.

TABLE 4

Crack Growth Resistance by PG Flex

| Compound No. | A | B | C |
|---|---|---|---|
| 15 min | 1,1,1 | 1,1,1 | 1,1,1 |
| 30 min | 1,1,1 | 1,1,1 | 1,1,1 |
| 60 min | 1,1,3 | 1,1,3 | 1,1,1 |
| 120 min | 1,1,8 | 1,1,8 | 1,1,1 |
| 180 min | 2,2,12 | 1,6,13 | 1,1,1 |
| 240 min | 4,8,23 | 1,23,31 | 1,1,1 |

Tear resistance is measured by a peel adhesion value (at 95° C. to self), to indicate a predictive measure of ultimate tear strength. The steady state (SS) tear resistance of the sidewall compound with Budene® 1280 was 139 Newtons as set forth below:

| Compound No. | A | B | C |
|---|---|---|---|
| Tear Resistance, SS, Avg. Load, N | 113 | 128 | 139 |

Most notably, both PG Flex and Tear Resistance are substantially better for Compound C than for A and B, indicating better crack growth resistance and tear resistance. As shown, tear resistance was improved over those for B and A in the range from about 8 percent to 23 percent respectively.

The improved tear resistance exhibited in compound C is also exhibited in a comparison of tread compounds: Compound D made with Budene® 1208; and Compound E, the novel tread compound, made with Budene® 1280, as follows:

Each tread compound was made in three stages, first and second non-productive stages followed by a productive stage using ingredients, given as phr based on 100 parts of all rubber present. In the first stage, ingredients are mixed in a Banbury® mixer for from about 1 to 10 min at a temperature in the range from about 150° C. to 170° C., until essentially homogeneous; in the second stage the ingredients are mixed for from about 1 to 10 min at a temperature in the range from about 140° C. to 160° C.; and in the third (productive) stage the ingredients are mixed for from about 1 to 4 min at a temperature in the range from about 90° C. to 110° C.; the time for mixing in each stage depends upon the ease with which the mass becomes essentially homogeneous. Moreover, it will be understood that the number of non-productive stages used for producing either the sidewall or the tread is not narrowly critical, depending upon several factors of commercial importance, and the number illustrated herein are deemed optimal for typical factors.

In the first non-productive stage the following ingredients were mixed for about 2.5 min at 160° C. in a Kobe Banbury® mixer:

| Compound No. | D | E |
| --- | --- | --- |
| NR | 20 | 20 |
| Budene ®1208 | 80 | 0 |
| Budene ®1280 | 0 | 80 |
| Carbon black, N-121 | 30 | 30 |
| Processing oil | 5 | 5 |
| Wax (blend) | 1.5 | 1.5 |
| Zinc oxide | 3 | 3 |
| Fatty acid | 3 | 3 |

The blended stock is cooled to ambient temperature (23° C.) and then, in the second non-productive stage, the following ingredients were mixed for about 2 min at 150° C. in the same mixer:

| Compound No. | D | E |
| --- | --- | --- |
| Carbon black, N-121 | 30 | 30 |
| Antiozonant | 2.5 | 2.5 |

The blended stock is cooled to room temperature (23° C.) and then, in the productive (third) stage, the following ingredients were mixed for about 2 min at 104° C. in the same mixer:

| Compound No. | D | E |
| --- | --- | --- |
| Sulfenamide accelerator | 1.5 | 1.5 |
| Sulfur | 1.4 | 1.4 |
| DPG accelerator[6] | 0.2 | 0.2 |

[6]diphenylguanidine

TABLE 5

| Properties of compared tread compounds | | |
| --- | --- | --- |
| Compound No. | D | E |
| Break Strength, MPa | 15.9 | 15.77 |
| Elongation at Break (%) | 424 | 426 |
| Modulus, 300% | 10.5 | 10.3 |
| Hardness at 23° C., Shore A | 70 | 69 |
| Hardness at 100° C., Shore A | 62 | 60 |
| Rebound at 23° C., ASTM D-1024 | 47 | 45 |
| Rebound at 100° C., ASTM D-1024 | 55 | 53 |
| Tear Resistance, SS, Avg. Load, N | 169 | 193 |

The above data indicate the tear resistance of E is about 14 percent better than that of D and all other properties are essentially the same.

The pneumatic tires of the present invention may be radial or bias. Preferably, the tires are radial.

While certain representative embodiments and details have been shown for the purpose of illustrating the invention, it will be apparent to those skilled in this art that various changes and modifications may be made therein without departing from the spirit or scope of the invention.

What is claimed:

1. In a sidewall compound comprising a mix of synthetic rubber, natural rubber, carbon black, an antidegradant and processing aids, which mixture is cured with a curative package, the improvement comprising, natural rubber present in a minor proportion by weight relative to all the rubber in the compound;

synthetic rubber of cis-1,4-polybutadiene present in the range from 55 phr to 7phr, the cis-1,4-polybutadiene having a cis-content of at least 90%, a polydispersity in the range from about 3 to 5, a number average molecular weight Mn in the range from 100,000 to 150,000 and a degree of branching in the range from 2 to 3.5;

wherein, the sidewall compound has an elongation at break higher than that of a sidewall compound made with a cis-1,4-polybutadiene having a polydispersity less than 3.

2. The sidewall compound of claim 1 wherein the cis-1,4-polybutadiene is produced with an organometal-based catalyst package including p-styrenated diphenylamine; and the antidegradant is selected from the group consisting of amines, phenolics, quinolines and mixtures thereof and is present in the range from about 1.5 to 10.0 phr.

3. The sidewall compound of claim 2 wherein the cis-1,4-polybutadiene has a cis-content of at least 95%.

4. The sidewall compound of claim 2 having a tensile strength (or break strength) and elongation percent at break each in the range from about 7 to 17% greater than those made with a high-cis-1,4-PBD having essentially the same Mooney viscosity, all other ingredients being the same.

* * * * *